UNITED STATES PATENT OFFICE.

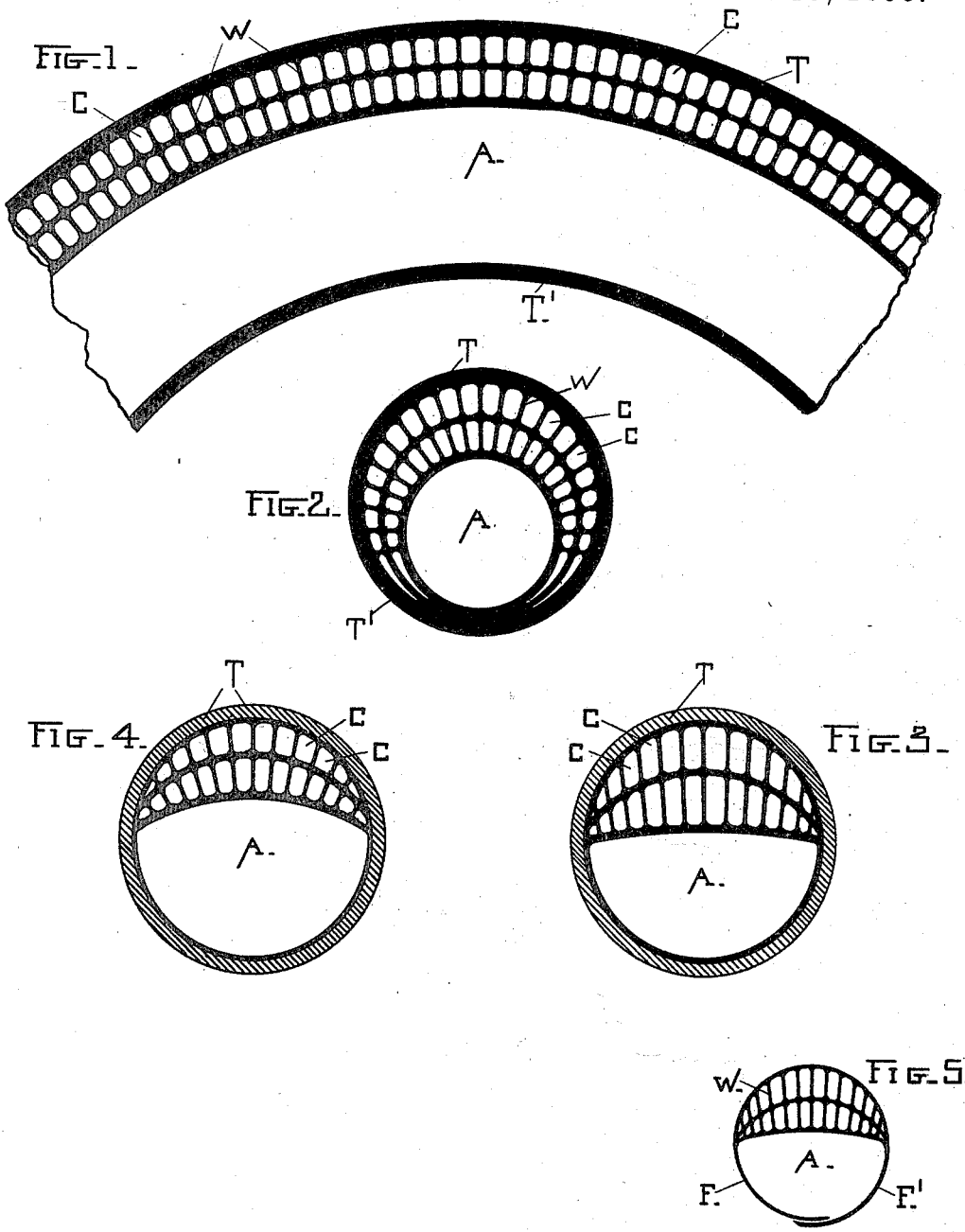

JOSIAH S. CARTER, OF LYNN, MASSACHUSETTS.

VEHICLE-TIRE.

SPECIFICATION forming part of Letters Patent No. 600,828, dated March 15, 1898.

Application filed November 13, 1895. Serial No. 568,758. (No model.)

*To all whom it may concern:*

Be it known that I, JOSIAH S. CARTER, a citizen of the United States, and a resident of Lynn, in the county of Essex and Commonwealth of Massachusetts, have invented certain new and useful Improvements in Vehicle-Tires, of which the following is a specification.

My present invention relates to that class of vehicle-tires possessing the highest degree of elasticity and known as "pneumatic tires," which tires are usually made of rubber, or in part of rubber, having the form of a hollow tube adapted to hold air under compression and to be attached to the felly of a wheel.

The object of my present invention is to reduce the liability of cutting or puncturing such a tire in its ordinary use, so as to call for immediate repairs, and also to facilitate such repairs in case such an accident occurs, while at the same time keeping the amount of material used in its construction, and therefore the weight, at a minimum.

My invention consists in placing in the interior of a hollow tube intended to be filled with compressed air and adjacent to the walls thereof a cellular or honeycomb structure of flexible, air-tight, and preferably elastic material, such as soft rubber, such structure constituting one or more layers of a series of cells, which cells do not communicate with each other nor with the unoccupied space in the middle of the tube, but are separate air-sacs. The walls of these cells can be, and preferably are, made of relatively quite thin material as compared with the outer containing-tube, and the cells lie back of the working face of the outer tube which is subject to cutting or puncture. The tube may be made with the cellular honeycomb structure as an integral part thereof, or such structure may be made as a separate piece to be drawn into the outer tube of the usual pattern.

Figure 1 is a sectional view lengthwise of part of a tire constructed as designed in my present invention. Fig. 2 is a sectional view crosswise of the structure Fig. 1. Figs. 3, 4, and 5 illustrate a modification in which the essential features of my invention appear in a separate structure which may be applied to any pneumatic or hollow tubular tire.

In Figs. 1 and 2 the heavy black lines T T' indicate the thick outer walls of a rubber or equivalent tube, T being the working face subject to accident in use.

C C; &c., represent a series of cells or air-sacs, two series of cells being shown in the illustration, (as regards depth,) although the number may be increased or diminished as desired. These cells are made by forming the rubber over suitable molds, one row being made with open ends, these ends being then closed by a flat piece cemented thereto or otherwise secured by heat and pressure, and other rows of similarly-formed cells being attached in a similar manner until the desired thickness has been reached. The walls of the cells are preferably quite thin. The cells so formed will usually be filled with air at atmospheric pressure, and when the inner unoccupied space is filled with compressed air they will of course contract until the air they contain is of the same density as that in the space A. So constructed an ordinary puncture in the wall T, as by a nail or tack, for instance, will simply penetrate one of the cell-spaces and allow the compressed air in it to escape, while the surrounding cells will of course expand and fill up the space first occupied by the injured cell. Moreover, a long nail or other object penetrating to the bottom of one cell and through it will still be prevented from opening communication to the larger air-space A, and upon being withdrawn the space of the broken cells will be filled up by the expansion of the others, as before, and with no perceptible diminution of the pressure in the space A. Again, to repair an injury so produced it is only necessary to inject into the broken cell from the exterior some cementing substance, such as a rubber cement, and the tire will then be practically as good as before.

In Figs. 1 and 2 the cellular structure has been shown as constituting an integral part of the whole tube; but in Figs. 3, 4, and 5 I have shown that it may be a separate structure, capable of being drawn into an outer tube T, similarly to the inflation-tube commonly used with pneumatic tires, the cellular structure being placed, as before, next to the working surface of the outer tube. Fig. 3 shows such a cellular structure in black lines, having an unoccupied space A to be filled with compressed air, and Fig. 4 shows the same tube when the air in the space A has been compressed, it being noticed that the cells C C, &c., are now contracted. If the pressure in A, for instance, is two atmospheres, the cells C C, &c., will occupy half the space they do uncompressed, and so on for different degrees of compression in A.

In Fig. 5 I have shown that the removable inner tube formed with the cellular structure upon it in accordance with my present invention may have free flaps F F', which overlap to a greater or less extent in accordance with the size of the outer containing-tube, and thus avoid wrinkles when the tube is inflated. When air is forced into the space A, the flaps are forced together, so as to form an air-tight seal.

I claim—

1. A pneumatic tire for vehicles having an outer flexible envelop, a honeycomb structure of rubber upon the inner surface of said envelop comprising a series of non-communicating cells arranged in definite order, outer and inner, and an unoccupied space back of said honeycomb structure adapted to contain a gas under pressure, as and for the purpose described.

2. A pneumatic tire for vehicles having an outer flexible envelop, a honeycomb structure upon the interior tread portion of said envelop the cells of which are arranged in outer and inner tiers, and an unoccupied space back of the honeycomb structure adapted to contain a gas under compression, as described and for the purpose set forth.

3. The improved pneumatic tire for vehicles herein described having an outer flexible envelop, a honeycomb structure of rubber occupying the inner surface of the tread portion of said tire and having a series of non-communicating sacs or cells of decreasing size toward the sides of the tire, and a free space back of said honeycomb structure adapted to contain compressed air, whereby said cells are maintained under compression.

4. A rubber tire for a pneumatic tire having formed integrally therewith a series of air sacs or cells and having free flaps adapted to overlap and make an air-tight seal when suitably inserted in an outer containing-tube and subjected to air-pressure, as set forth.

5. A wheel-tire comprising an inner inflatable tube, an outer covering and an intermediate cellular structure; said cellular structure being composed of two sets of closed cells superposed one upon the other and formed by radial partitions arranged at an angle to each other between outer, intermediate and inner inclosing walls.

In witness whereof I have hereunto set my hand, this 11th day of November, 1895, in said county and Commonwealth aforementioned.

JOSIAH S. CARTER.

Witnesses:
 JOHN W. GIBBONEY,
 HARRY O. WESTENDARP.